(12) United States Patent
Venusio Tamburrino

(10) Patent No.: US 11,882,802 B2
(45) Date of Patent: Jan. 30, 2024

(54) GREENHOUSE WITH PHOTOVOLTAIC SYSTEM

(71) Applicant: Luigi Giuseppe Maria Venusio Tamburrino, Matera (IT)

(72) Inventor: Luigi Giuseppe Maria Venusio Tamburrino, Matera (IT)

( * ) Notice: Subject to any disclaimer, the term of this patent is extended or adjusted under 35 U.S.C. 154(b) by 148 days.

(21) Appl. No.: 17/614,251

(22) PCT Filed: Jun. 10, 2020

(86) PCT No.: PCT/IT2020/050147
§ 371 (c)(1),
(2) Date: Nov. 24, 2021

(87) PCT Pub. No.: WO2020/250261
PCT Pub. Date: Dec. 17, 2020

(65) Prior Publication Data
US 2022/0217920 A1    Jul. 14, 2022

(30) Foreign Application Priority Data
Jun. 12, 2019    (IT) .................. 102019000008787

(51) Int. Cl.
| | |
|---|---|
| *A01G 9/24* | (2006.01) |
| *H02S 20/23* | (2014.01) |
| *H02S 40/10* | (2014.01) |
| *H02S 40/22* | (2014.01) |
| *H02S 40/42* | (2014.01) |
| *A01G 9/14* | (2006.01) |

(52) U.S. Cl.
CPC ........... *A01G 9/243* (2013.01); *A01G 9/1476* (2013.01); *A01G 9/24* (2013.01); *H02S 20/23* (2014.12); *H02S 40/10* (2014.12); *H02S 40/22* (2014.12); *H02S 40/425* (2014.12)

(58) Field of Classification Search
CPC ...... A01G 9/243; A01G 9/1476; H02S 20/23; H02S 40/10; H02S 40/22; H02S 40/425
See application file for complete search history.

(56) References Cited

U.S. PATENT DOCUMENTS

2021/0006201 A1*  1/2021  Hinson ................. G01S 3/7861
2021/0249989 A1*  8/2021  Kato ....................... H02S 20/32

FOREIGN PATENT DOCUMENTS

| CN | 105941012 | | 9/2016 | |
| CN | 105941012 B | * | 5/2019 | .............. A01G 9/14 |
| KR | 20120007156 | | 1/2012 | |

OTHER PUBLICATIONS

Preet Sajan, "Water and phase change material based photovoltaic thermal management systems: a review" Renewable and Sustainable Energy Reviews, vol. 82, Oct. 4, 2017 (Oct. 4, 2017), p. 791-807 This document discloses water cooling of photovoltaic panels using a tubing system, see e.g. figure 2 (p. 793).

Alam Sheikh Md Shahin et al., "Performance comparison of mirror reflected solar panel with tracking and cooling", 2016 4th International Conference on the Development in the in Renewable Energy Technology (ICDRET), UIU,Jan. 7, 2016 (Jan. 7, 2016), p. 1-4 This document discloses a metallic carpentry structure with a photovoltaic system, reflection wings reflecting solar irradiation to the PV panels and a water system for cooling and washing the PV panels. E.g. figure 4.

* cited by examiner

*Primary Examiner* — Richard G Davis
(74) *Attorney, Agent, or Firm* — Themis Law

(57) ABSTRACT

A new integrated unitary system for producing electricity for a greenhouse or other metal carpentry structure associates a photovoltaic system, an innovative apparatus reflecting solar radiation, and an innovative water system for cooling and washing photovoltaic panels, which are all combined with the greenhouse or the metal carpentry structure.

13 Claims, 13 Drawing Sheets

GREENHOUSE WITH PHOTOVOLTAIC SYSTEM

TECHNICAL FIELD OF THE INVENTION

The field of the invention is that of a unitary integrated system which associates a photovoltaic system, with high efficiency, for the production of electricity to a greenhouse, or even just to a metal carpentry structure, for agriculture or floral cultivation. This integrated system is suitable for maximizing the production of electricity by using the least amount of agricultural land and, at the same time, it is perfectly suitable for allowing crops to be cultivated in the soil below without it being disadvantaged but, on the contrary, it benefits the crops. The high-yield photovoltaic system could also be advantageously installed on structures, on the ground or on buildings not necessarily intended for agriculture.

STATE OF THE PRE-EXISTING ART

The cultivation under greenhouse, or under metal carpentry structures that support plastic covers or hail-proof protection nets it is known technology. There are currently many types of greenhouses of the most diverse shapes and sizes: double-pitched, single-pitched, barrel-shaped, tunnel roofs; made of glass, polycarbonate or plastic film; single-aisle or multi-aisle; with spans of different sizes; with support pillars in metal carpentry or other materials; with windows for ventilation located at the ridge or at the base of the slopes or laterally along the entire perimeter. For some years now, with the need to produce electricity from renewable sources, the development of greenhouses suitable for the installation of photovoltaic panels on the roofs has developed and has, at the same time, allowed to cultivate, in the ground below, the agricultural or floral crops. To date, the realization of photovoltaic systems on greenhouses entails many problems and disadvantages for crops and in some cases also for the photovoltaic plants above. For these reasons, this technology is currently underdeveloped. In fact, a fundamental element for the growth of crops is the solar radiation, crucial for the chlorophyll photosynthesis to take place. In current technology, three different types of photovoltaic greenhouses have mainly developed. The first type consists in filling the entire roof of the greenhouse with photovoltaic panels, therefore causing, in the ground below, a total shading and thus limiting its use only to a very few types of crops. This circumstance represents objectively a great limitation, as this type of structure, due to the total shading, is not suitable for the vast majority of crops. Therefore, if for market reasons, it is no longer profitable to grow the few crops allowed in such lightless environment and there is, consequently, the need for replacement with other crops, the entire structure would be unusable. A further problem, which this type entails, is that the photo-voltaic panels, radiating heat inside the greenhouse, alter the thermal balance thus seriously compromising the optimal development of the cultivated plants. However, this type, while causing limitations and disadvantages to its agricultural function, is suitable for its photovoltaic function and has a normal yield in the production of electricity based on the size of the surfaces used. The second type consists in a greenhouse built with the longitudinal development axis in the east-west direction, not optimal for crops, and with only the south-facing roofs covered with photovoltaic panels. This type, also providing a high level of shading, does not create, in the underlying soil, the optimal conditions for most crops. Also in this case the photovoltaic panels, generating heat and altering the thermal balance of the greenhouse, compromise the optimal development of the cultivated plants.

However this type of structure, like the previous one, while causing limitations and disadvantages to its agricultural function, is suitable for its photo-voltaic function and has a normal efficiency in the production of electricity, always related to the size of surfaces used. The third type consists in a greenhouse, built with a double layer, in which the photovoltaic panels, widely spaced from each other, occupy a minimum part of the roofing. This type allows a good level of solar radiation for the underlying crops and is therefore suitable for its agricultural function, but nevertheless, it causes many disadvantages to its photovoltaic function. In fact, this type has the disadvantage of having a poor performance in the production of electricity due to the dispersion caused by the greater length of the electric cables, has the disadvantage of having higher costs due to the purchase of greater quantities of electric cables and, finally, has the disadvantage of occupying a greater quantity of land compared to the quantity of electricity produced. Consequently, due to these disadvantages, this typology is not very convenient since, with the same yield, it entails a greater economic investment. Finally, in all these types, the ordinary and extraordinary maintenance operations are uncomfortable and expensive and even sometimes, in particular cultivation phases, they are impractical or even impossible. Therefore it appears that the pre-existing techniques of the various systems that associate photovoltaic systems to greenhouses is such that if the photovoltaic systems are privileged they generate disadvantages for agricultural crops, and vice versa if agricultural crops are favoured, disadvantages are generated for the photovoltaic systems above.

THE INVENTION

The power plants for the production of electricity from renewable photo-voltaic sources, especially large ones, involve mainly the occupation of large areas of arable land. In fact, the overwhelming majority of photovoltaic systems have been built in a "fixed to the ground" manner and this setting, for the installation of a single MWPP of power, requires with the existing technology, the occupation of approximately three hectares of arable land. It is evident that if on one hand this contributes to the deserving production of "clean energy", on the other hand, however, it removes a large quantity of land from the production of crops. Therefore in many countries it is no longer allowed to build photovoltaic plants in the "fixed on the ground" mode on arable farmland. In order to avoid this unacceptable inconvenience for many reasons and in many countries, it has been thought to realize photovoltaic systems on greenhouses, or on metallic carpentry structures raised from the ground, to allow simultaneously, two functions: the crop cultivation and electricity production. There have been many projects and solutions found in order to produce electricity while allowing the cultivation of land. However, as previously reported, these solutions have shown some downsides. All the projects, where the main objective is to guarantee satisfactory production of electricity and to contain the costs of the investment to keep it's convenience, are disadvantageous for the cultivation, because of the total or partial shading of the land, which greatly limits the growth of crops compromising the quality or quantities of the products grown, and also because of the harmful alteration of the thermal balance that occurs inside the greenhouse. Vice versa, all projects, in which the main objective is to guarantee the quality and quantity of the growth of crops, are not very convenient as they entail significant limitations and disadvantages to the overlying photovoltaic system, higher costs, greater quantities of land to be occupied and lower efficiency in the production of electricity as previously described. Ultimately the technical problem that arises in associating a photovoltaic system with a greenhouse, or even with a metal carpentry structure, is that if electricity production is favored, disadvantages are created for crop cultivation, if instead crop cultivation is favored, disadvantages are created for the production of electricity.

PURPOSE OF THE INVENTION

The purpose of the invention is to solve the above technical problem by associating an innovative type of greenhouse, or structure in metal carpentry, and an innovative high-yield photovoltaic system. This association guarantees to the two systems an autonomous and independent functioning and does not produce any limitation or disadvantage to both, but instead, creates synergies and brings to them reciprocal improvements and advantages in terms of costs, in terms of crop cultivation and floral production and with regards to the production of electricity.

WHAT IS THE INVENTION

Figure 1:
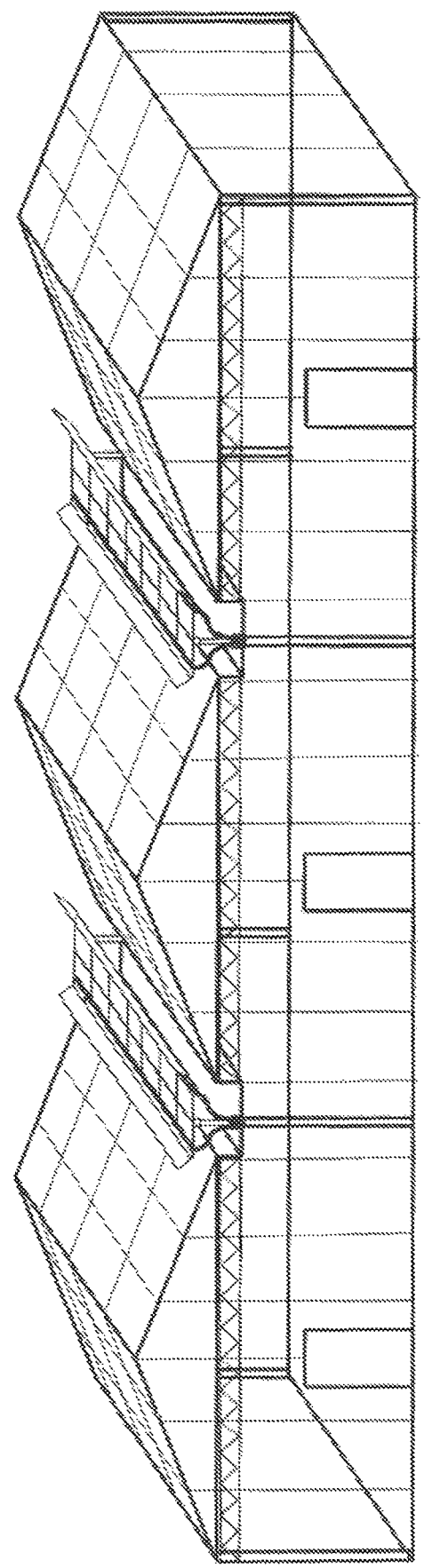
FIG. 1 shows an integrated unitary device on a greenhouse according to the invention.
Figure 2:
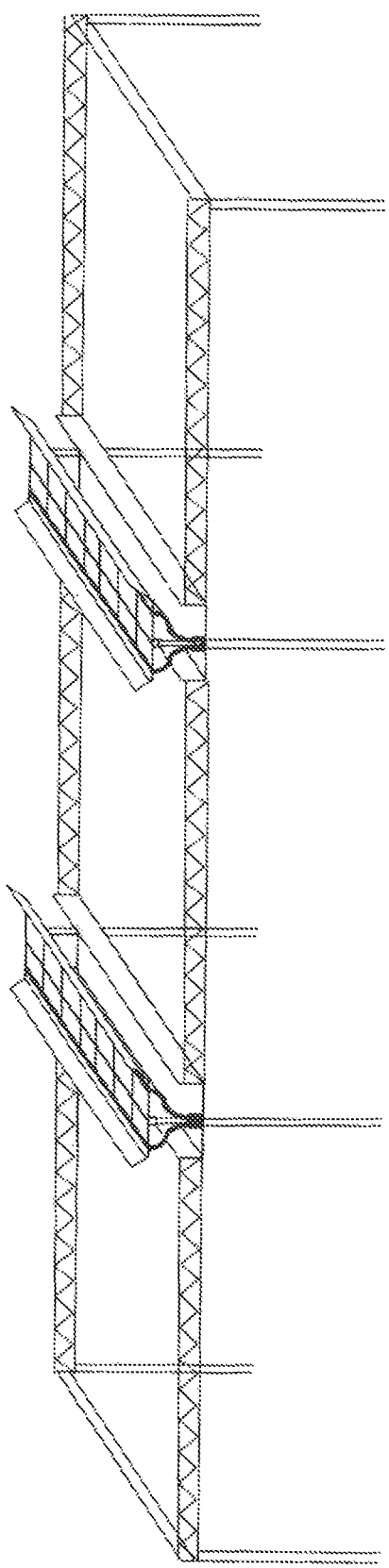
FIG. 2 shows an integrated unitary device on a metal carpentry structure.
Figure 3:
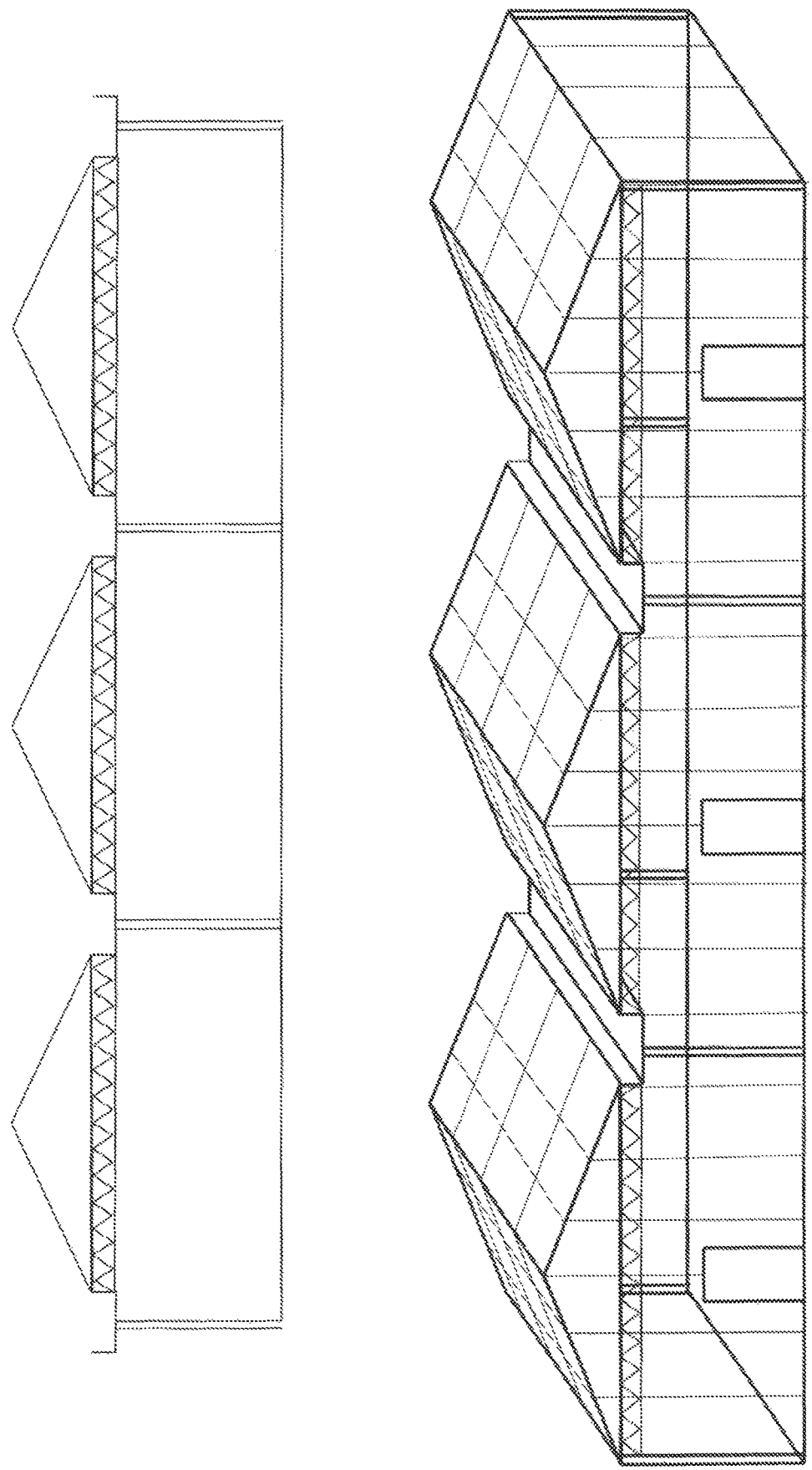
FIG. 3 shows an architecture of the greenhouse.
Figure 4:
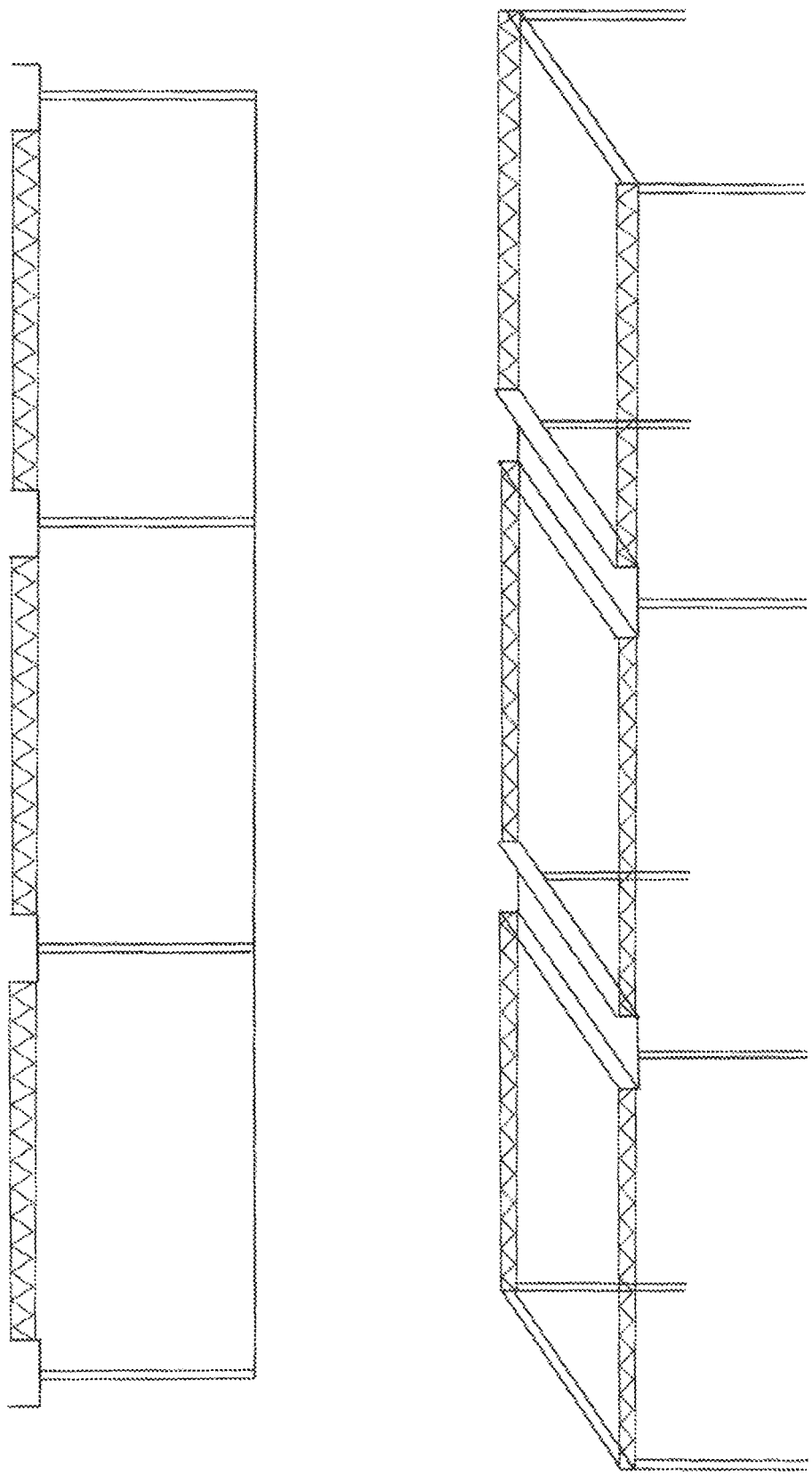
FIG. 4 shows an architecture of the structure in metal carpentry.
Figure 10:
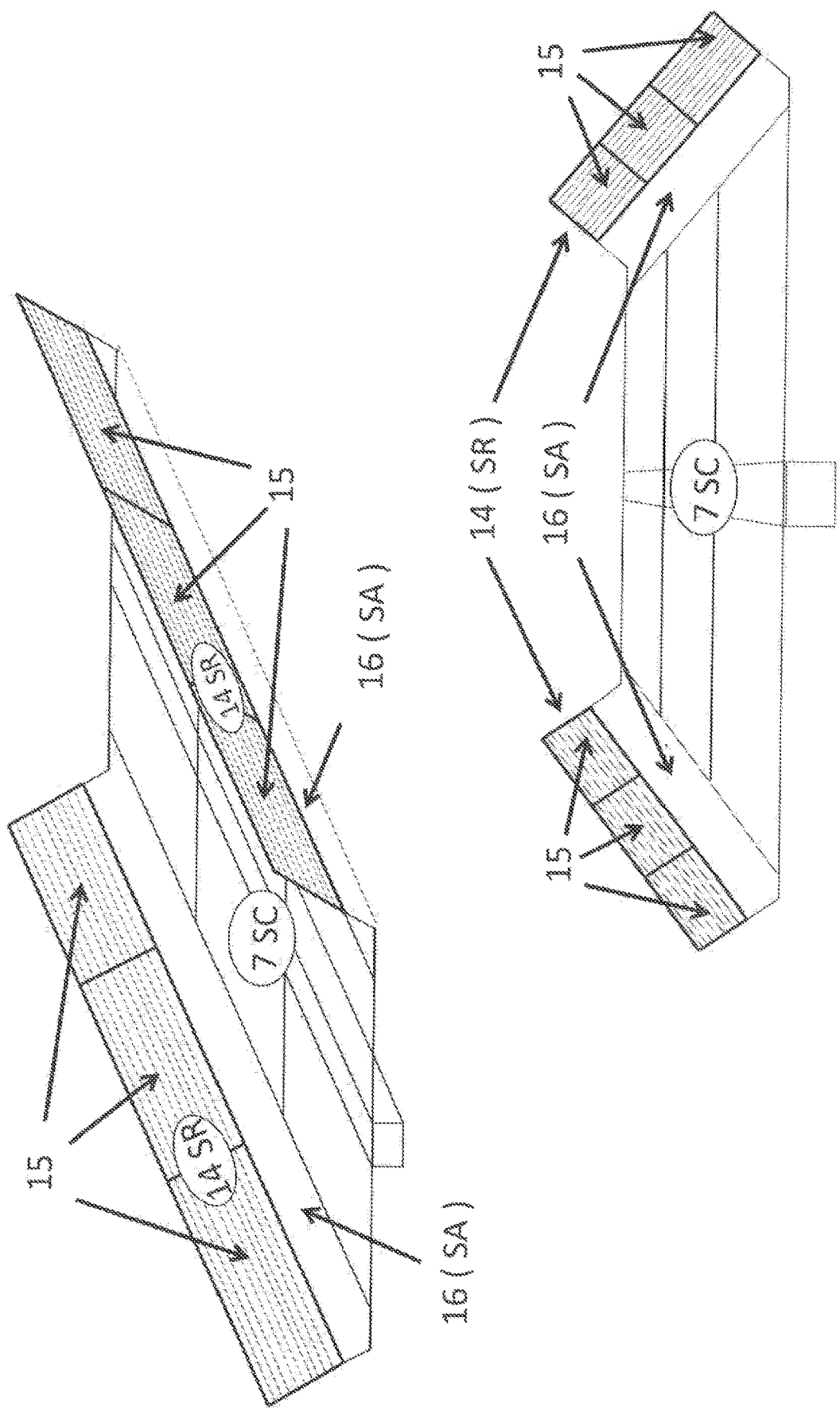
FIG. 10 shows a system reflecting solar radiation using reflective panels.
Figure 11:
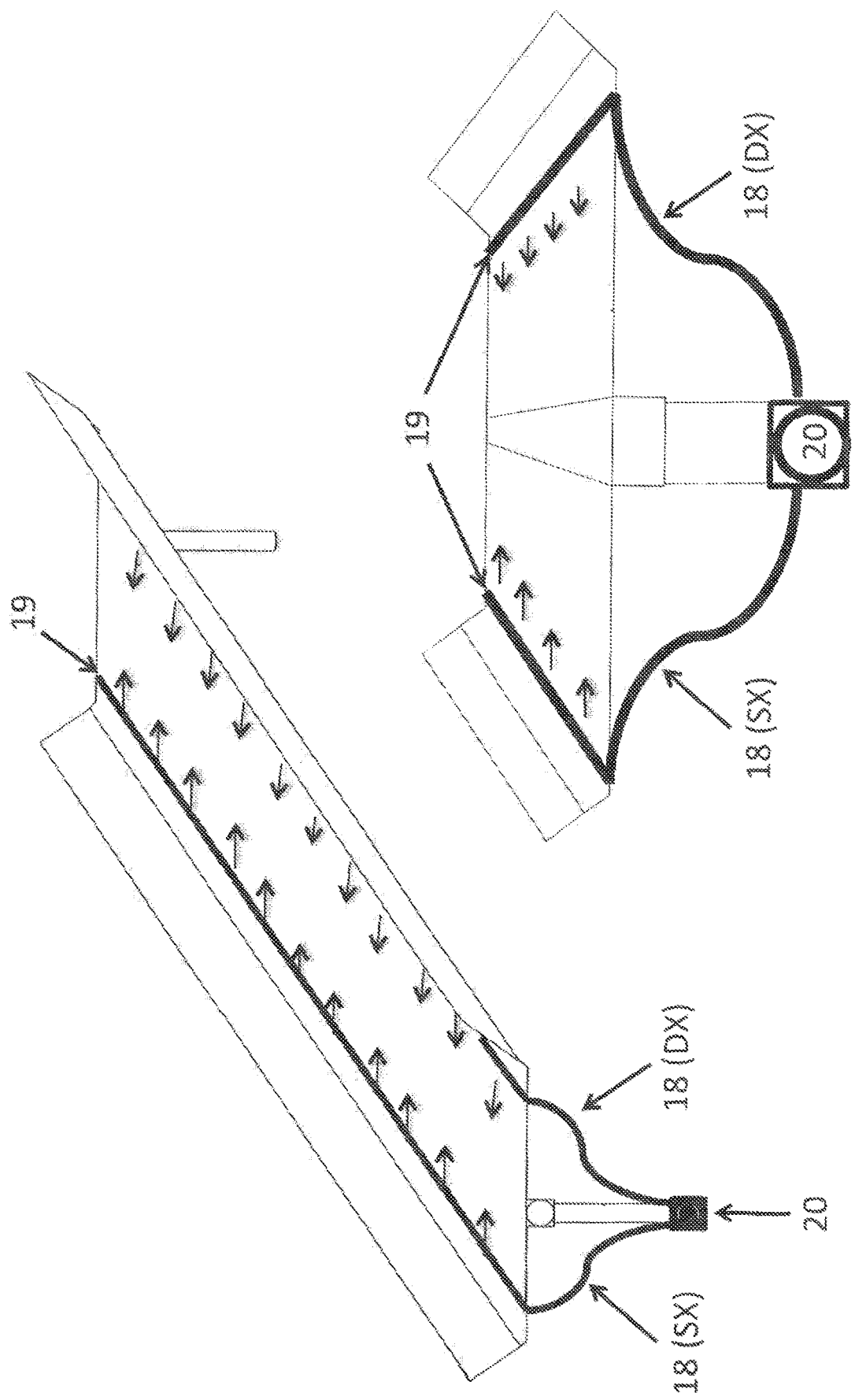
FIG. 11 shows a double circuit water system.
Figure 12:
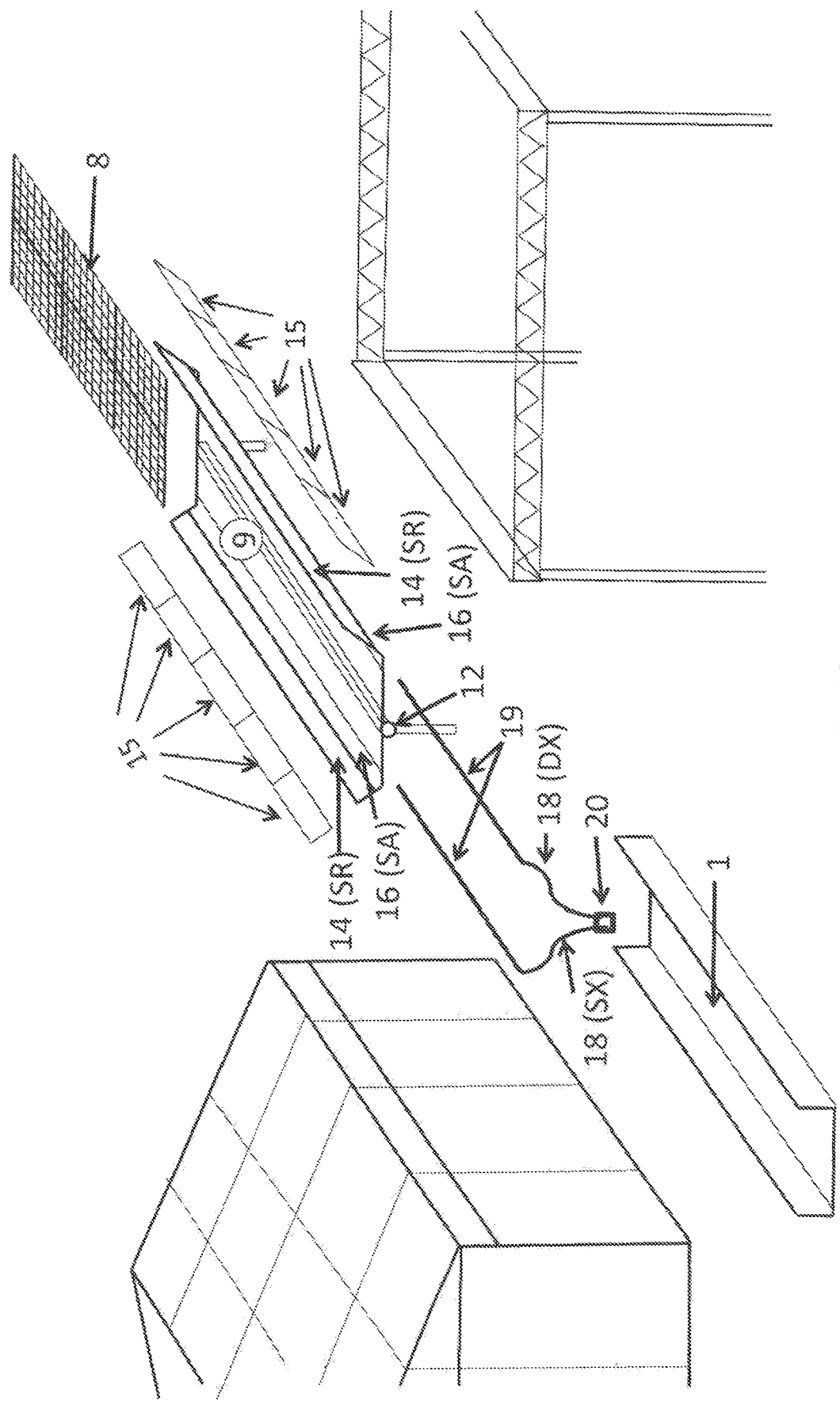
FIG. 12 shows the components of an integrated unitary system according to the invention.
Figure 13:
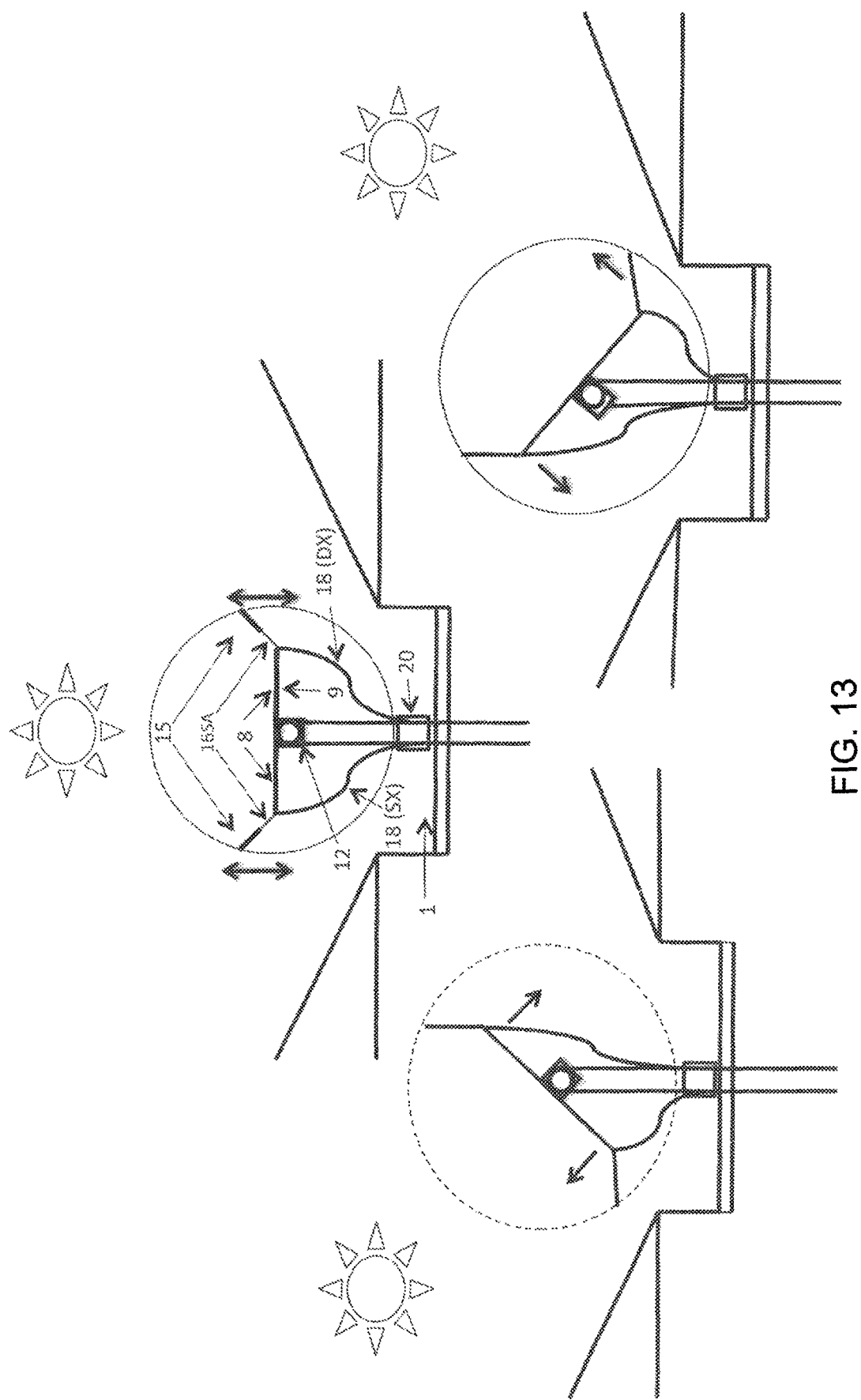
FIG. 13 shows the operation of an integrated unitary system according to the invention.

The invention consists of a unitary integrated system (shown in the drawings attached in FIGS. 1 and 2), with several component parts, to be installed on an arable land, having two functions: the first is to allow optimal crop cultivation or floral production; the second is to allow a high production of electricity. This integrated unitary system achieves this result by combining:

An innovative type of greenhouse (FIG. 3) or structure in metal carpentry (FIG. 4), sufficiently raised above the ground to allow cultivation, that are innovative by introducing in the architectural configuration of the roofs, a wide walkway-gutter channel (FIG. 5 n. 1) and are also innovated by the fact that they were conceived according to the criterion of modularity (FIG. 6) of its component parts therefore realised in an modular manner (FIG. 6 n. 2,3,4 and 5), An innovative photovoltaic system with mono-axial tracking at 0° inclination (FIG. 7 n. 6) which is innovated with the introduction of a tilting load-bearing frame (FIG. 9 n. 9) on which to install the photovoltaic panels, (FIG. 8 n. 8) the reflective panels (FIG. 10 n. 15) and the pipes (FIG. 11 n. 19) of the double-circuit water system (FIG. 11 n. 17) (FIG. 11 n. 18 sx and n. 18 dx);

A specific innovative apparatus reflecting solar radiation (FIG. 10 n. 13), aimed at increasing the radiation of the absorbing surfaces (SC) (FIG. 7 n. 7 and FIG. 8 n. 7) of the photovoltaic panels (FIG. 8 n. 8), which is innovated with the introduction of an open-space (SA) (FIG. 10 n. 16), between the photovoltaic panels (FIG. 8 n. 8) and the reflective panels (FIG. 10 n. 15), suitable for allowing both the outflow of the wind and the dissipation of heat from the photovoltaic panels;

A specific innovative water system (FIG. 11 n. 17), aimed and suitable both for cooling and washing of photovoltaic panels and for irrigation of crops, which is innovated with the introduction of a double-circuit (FIG. 11 n 18 sx and n. 18 dx) of pipes (FIG. 11 n. 19) and with the introduction of a switching valve (FIG. 11 n. 20) for reversing the flow;

All reported in the attached drawings and subsequently fully described. This unitary integrated system represents an innovation of the pre-existing technology (which is intended to be protected by claim no 1).

THE COMPONENTS OF THE INVENTION

The invention, as already described, associates a greenhouse (FIG. 1), or a metal carpentry structure (FIG. 2), a photovoltaic system (FIG. 7 n. 6), a reflective system (FIG. 10 n. 13), and a water system (FIG. 11 n. 17). These known technologies innovatively modified and combined become the components of a unitary integrated system suitable to practice, simultaneously, on the same ground and with a single structure two different production activities and suitable to maximize and optimize the production results of the two activities to which the system is dedicated, namely the growth of crops and the photovoltaic energy production.

Figure 5:
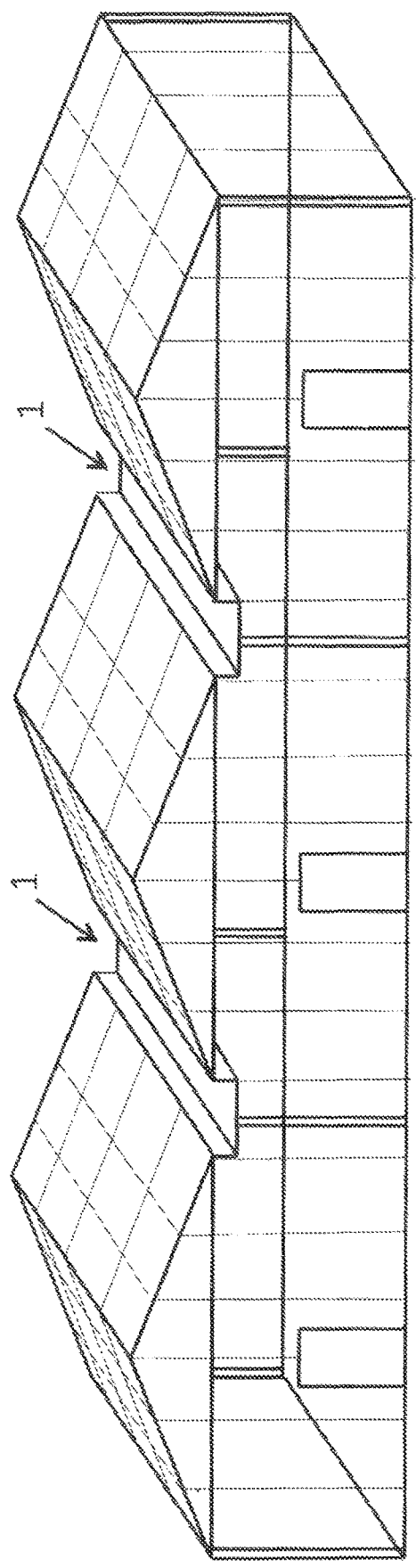
FIG. 5 shows a walk-away gutter channel.
Figure 5:
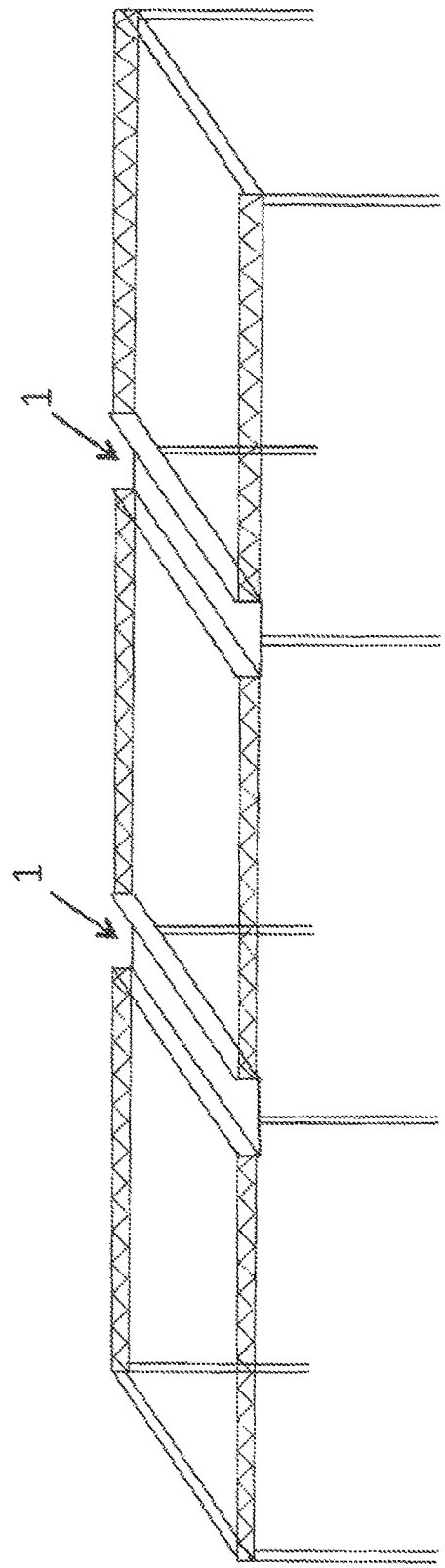
Figure 6:
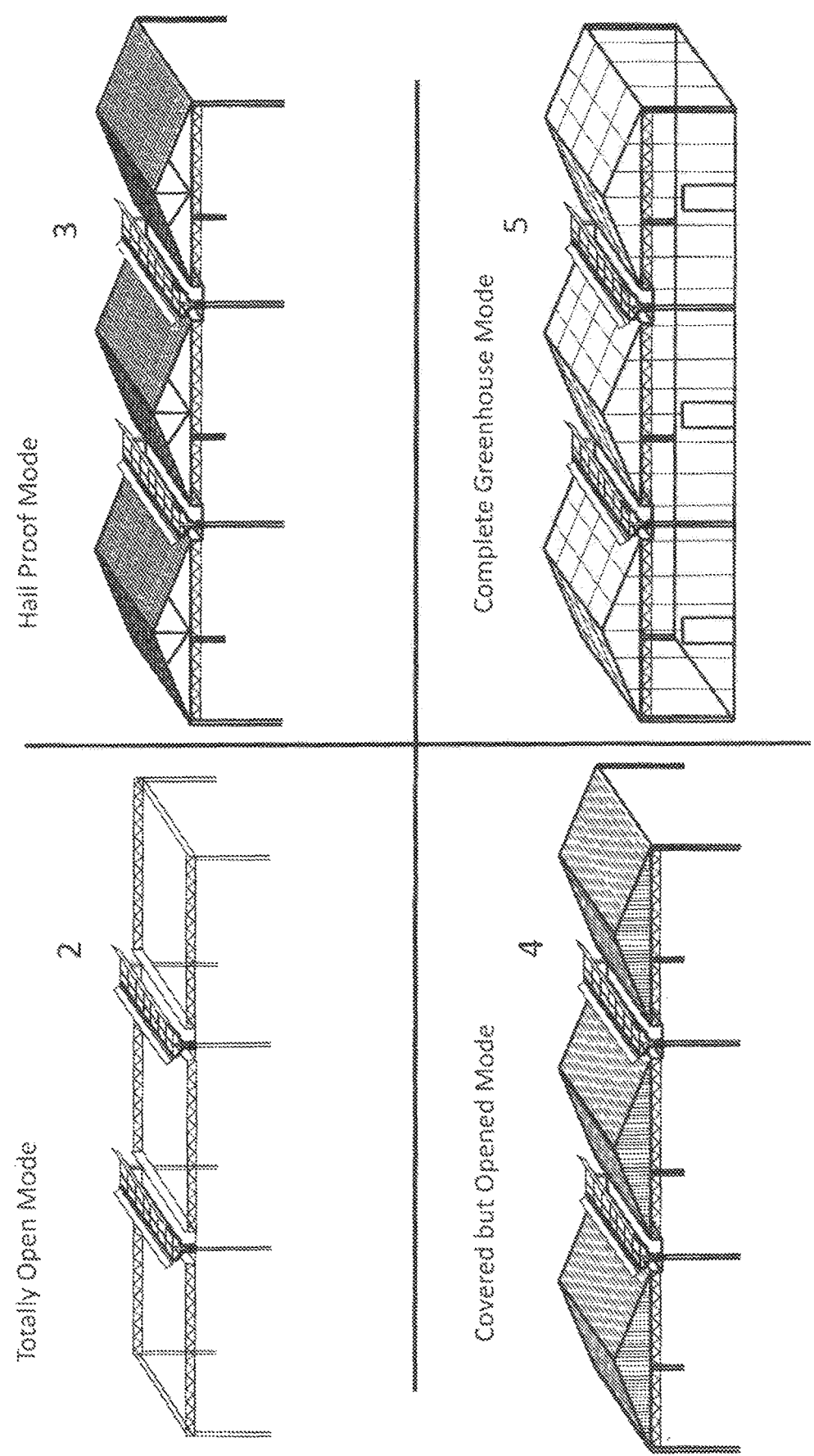
FIG. 6 shows the modularity of a greenhouse according to the invention.
Figure 7:
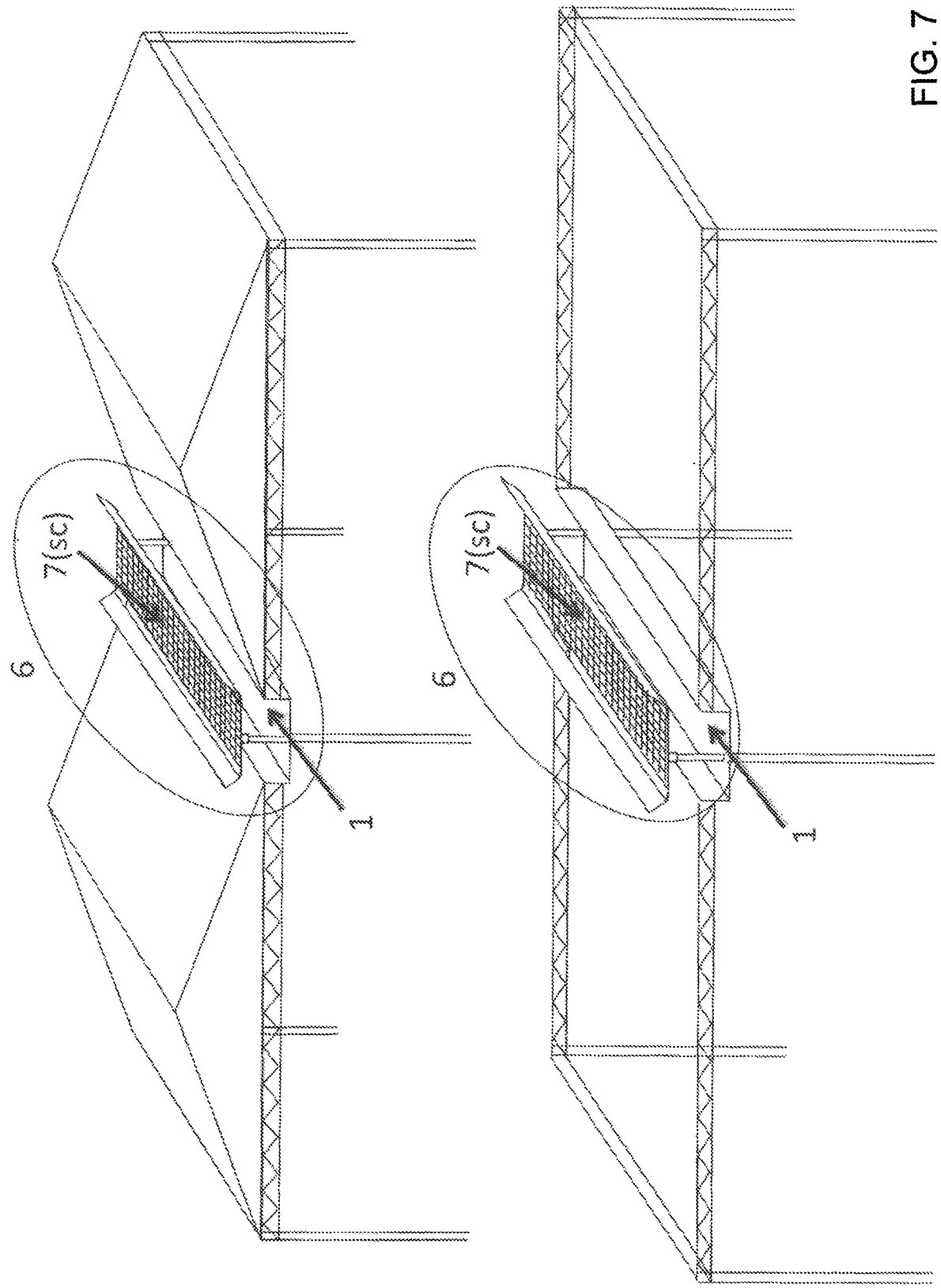
FIG. 7 shows a photovoltaic system according to the invention.
Figure 8:
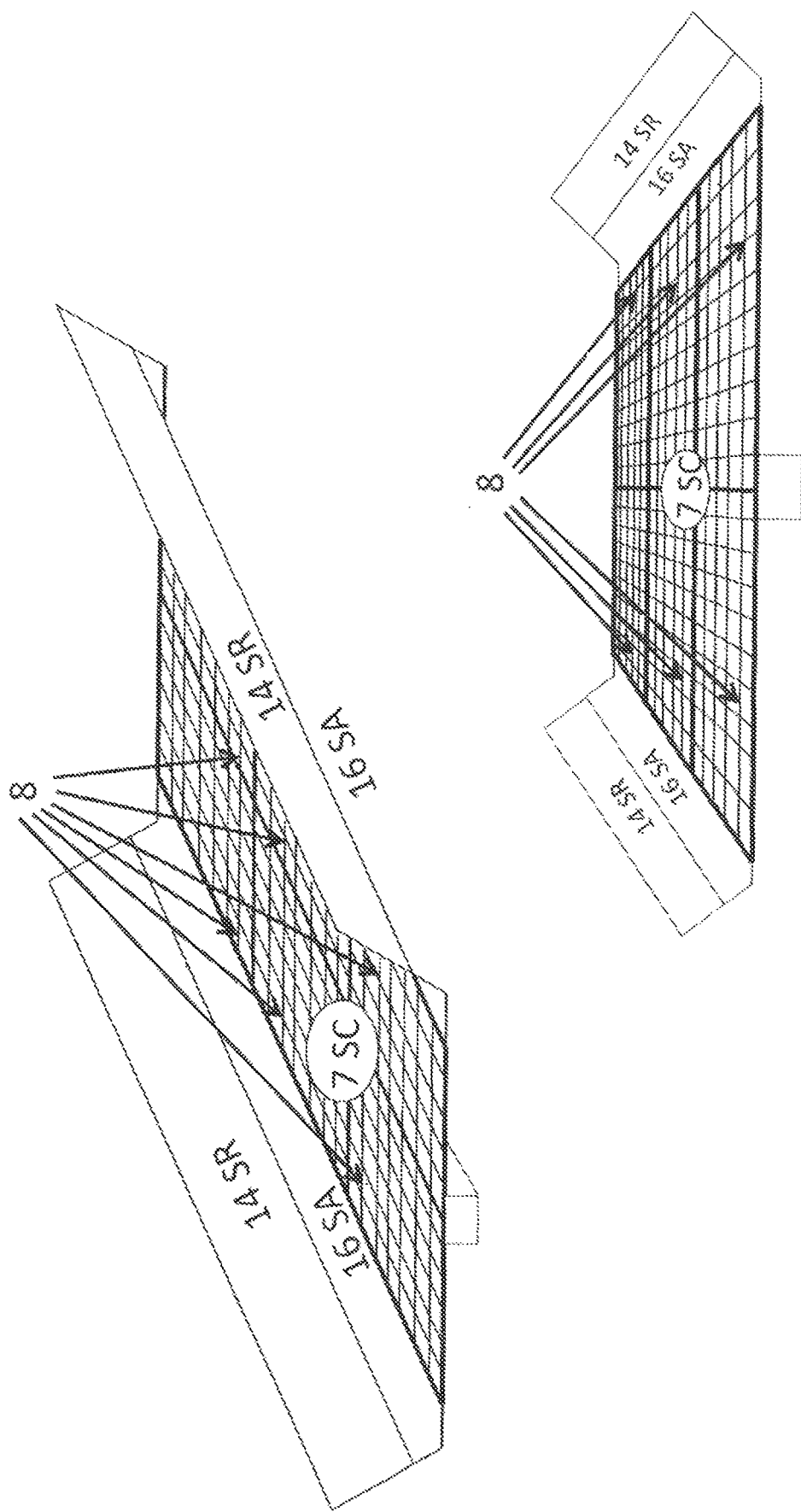
FIG. 8 shows a capturing surface with photovoltaic panels.

The unitary integrated system consists of several innovative components of known technologies. The invented system is such that the two activities, while operating on the same grounds and while using the same structure, remain however totally autonomous and develop their functions independently of each other, without limitations or harmful interference, but on instead, mutually benefiting each other. The total autonomy and independence of operations of the two productive sectors of the integrated system, without limitations or harmful interferences or unfavorable conditions, represents an innovation of the pre-existing technology (which we intend to protect with claim no 13). The integrated unitary system provides for four different configuration modes according to the needs arising from agricultural activities. It is functionally made up of several component parts. Some component parts of the system are used by both combined systems and are essential building blocks of both the agriculture and photovoltaic production sectors; other component parts, instead, have specific functional elements of one or the other of the two sectors. The components that the two sectors have in common are An arable land;
The foundations;
The supporting pillars;
The connecting beams;
The walkway-gutter channel (FIG. 5 n. 1);
The system for channelling rainwater;
A well from which to draw water;
A rainwater collection and storage tank;
A pre-positioned filtering tank;
A water station;
A water system (FIG. 11 n. 17);
An electrical substation;
An electrical system;

These components, in this system, are essential and necessary common parts for the operation of both the greenhouse system and the photovoltaic system. To complete the structure with agricultural function, the additional components are:

Trusses or other structures in metal carpentry to support the various types of roofing, but not necessary for some types of crops;
Layers in glass or other materials, but not necessary for some types of crops;
Windows for aeration, but not necessary for some types of crops;
Heating/cooling system, but not necessary for certain types of crops;
Curtain walls with the relative access doors, but not necessary for some types of crops;

To complete the system structure with photovoltaic function, the additional components are:

A photovoltaic system (FIG. 7 n. 6) with single axis solar tracking at 0° inclination;
A specific innovative tilting load-bearing frame (FIG. 9 n. 9) in steel prepared for the installation of photovoltaic panels (FIG. 8 n. 8), reflective panels (FIG. 10 n. 15) and water pipes (FIG. 11 n. 19) for the cooling and washing of photovoltaic panels;
The photovoltaic panels capturing solar radiation (FIG. 8 n. 8);
A system reflecting solar radiation (FIG. 10 n. 13) including the reflective panels (FIG. 10 n. 15) innovated with the introduction of a designed opening for ventilation and for the outflow of the wind by an open-space (SA) (FIG. 10 n. 16) between the photovoltaic panels (FIG. H n. 8) and the reflective panels (FIG. 10 n. 15);
A water system (FIG. 11 n. 17), for the cooling and washing of photovoltaic panels (FIG. H n. 8), connected to the main water system, innovated with the introduction of a double-circuit (FIG. 11 n. 18 sx and N. 18 dx) of pipes (FIG. 11 n. 19) for the uniform circulation and diffusion of water on the capturing surfaces of the photovoltaic panels (FIG. 11 n. 8) and with a special switch gate valve (FIG. M n. 20) for the flow controlled by the tracker;
Electrical substation, protections, transformers, inverters, field panels, electric cables and anything else necessary for the operation of a photovoltaic system.

The Structure with Agricultural Function

In this invention, the greenhouse, or even the metal carpentry structure, in its optimal configuration, is constituted, but not necessarily, by several aisles side by side having in common the central support pillars; the roof is made, but not necessarily, with a gable and is made up, but not necessarily, of a series of trusses suitable for supporting the roofs; the roofs are, but not necessarily, with opposing and sloping layers and arranged for the installation of either glass, polycarbonate panels, anchoring plastic films or hail protection nets. The longitudinal axis of the aisles is oriented in the north-south direction, optimal orientation for crops.

The Walkway-Gutter

In the roofs, between the opposite pitches of the adjacent aisles, usually, in traditional technology, a small channel is created for the collection and disposal of rainwater. In the present invention, the configuration of the architecture of the greenhouse, or of the metal carpentry structure, is innovated by providing the construction of a large walkway-gutter channel (FIG. 5 n. 1) in light transparent material, suitable for treading and compliant with accident prevention regulations. The configuration of the greenhouse architecture, shown in the drawings attached in FIG. C (rev. No 5) and of the architecture of the metal structure, shown in the attached drawings in FIG. D (rev. No 6), not entailed in traditional structures, represents an innovation of the pre-existing technology (which is intended to be protected respectively, with claims no 5 and no 6). This walkway-gutter channel (FIG. E n. 1) is used for the installation of the photovoltaic system and is, moreover, perfectly suitable for the carrying out, in safety and easily, of all the necessary maintenance interventions both for the photovoltaic system and for the greenhouse or structure in metal carpentry. This walkway-gutter channel (FIG. 5 n. 1) retains the function of collecting rainwater which is channeled, through a filtering system, into a collection tank to be subsequently used both for the irrigation and for the cooling and washing of photovoltaic panels. This walkway-gutter channel, shown in the attached drawings in FIG. E and indicated with the number 1, not foreseen in any type of traditional greenhouse and metal carpentry structure, represents an innovation of the existing technology (which it is intended to be protected with claim no 7).

This greenhouse structure, or structure in metal carpentry, has been innovatively conceived with the aim of being totally independent from the photovoltaic system above it. Therefore the structure can be made with all the specific technical-construction characteristics necessary for the various types of crops, and in all of the possible multiple configurations. Moreover, it has been designed in order to be able to benefit from a high degree of brightness, as better specified later on, to make the underlying soil suitable for any type of crop culture. Ultimately the invention allows to fully execute agricultural growth of crops without any limitation of any kind.

Structure Modularity—Modular Function

From the analysis of the pre-existing technology, it emerged that the two functions, agricultural and photovoltaic, in associating each other, influence each other in an unfavorable way. If the agricultural function is optimized, disadvantages to the photovoltaic one are created and if, on the other hand, the photovoltaic function is optimzed, this last creates disadvantages to the agricultural one. The present invention in associating the two functions, in a single unitary integrated system, not only solves and overcomes these reciprocal unfavorable conditions but, on the contrary, creates synergies, bringing mutual benefits and advantages, reducing costs and maximizing the production results of both functions. The present invention, as previously illustrated, consists of a unitary integrated system suitable for developing two different activities on the same ground, namely, agriculture and the production of electricity. To this end, the invention provides that the two components of the integrated-independent system develop their functions autonomously, without disadvantaging each other, and that the operating of each respective system is carried out independently. The agricultural component of the invention was designed by providing that it can be used to practice multiple types of crops whose plants often have different if not opposite needs. Therefore, the entire structure in metal carpentry, to be suitable for use even in the case of replacement of crops, has been conceived in a "modular mode" (FIG. 6), so that some of its functional parts can be added to the basic structure or removed from the structure when it is configured in its most complete version. To this end, the structure has been designed so that it can be used in four different configuration modes (FIG. 6 n. 2,3,4 and 5) in order to adapt to the needs of the different types of crops. A first method provides only for the installation of the pillars, the beams connecting the pillars and the walkway-gutter channel (FIG. 5 n. 1), all of which suitable for supporting the planned photovoltaic system (FIG. 7 n. 6). This "totally open" mode (FIG. 6 n. 2) does not provide for any cover or side closures and can be used for all crops in an open field that do not require a confined environment or coverings with plastic film or with hail-proof nets. This mode allows a modest gathering of rainwater, equal to approximately 20%, due to the quantities collected by the photovoltaic system (FIG. 7 n. 6) and from the walkway-gutter channel (FIG. 5 n. 1) which, obviously, are present in this mode. A second "hail-proof" mode (FIG. 6 n. 3) provides that trusses suitable for supporting the hail-proof nets are installed on the metal structure, as it is required in some types of crops. This mode allows a greater recovery of rainwater, compared to the previous mode, since the hail-proof nets also contribute to collecting and channeling a certain quantity of water. A third "covered but open" mode (FIG. 6 n. 4) provides that trusses suitable for supporting polycarbonate or plastic covers are installed on the structure leaving the entire perimeter open. However this method, compared to the previous one, allows the protection of the plants cultivated from hail and also from excessive rains which, in some stages of cultivation, can be extremely harmful.

This method also allows the collection of rainwater that has precipitated on the entire surface of the roofs with consequent considerable water savings. A fourth "complete greenhouse" mode (FIG. 6 n. 5) provides that, on the structure's roofs, the trusses supports glass, poly-carbonate, or plastic film panels and that there are, made from the same materials, perimeter walls so as to create a confined environment to practice greenhouse cultivation. This configuration, which is the most complete version of the system, allows, like the previous one, the collection of all rainwater with the consequent advantage of saving water. The modularity of the parts making up the structure, which allows a wide flexibility of use, represents an innovation of the pre-existing technology (which is intended to be protected with claim no 12).

The Structure with Photovoltaic Function

Figure 9:
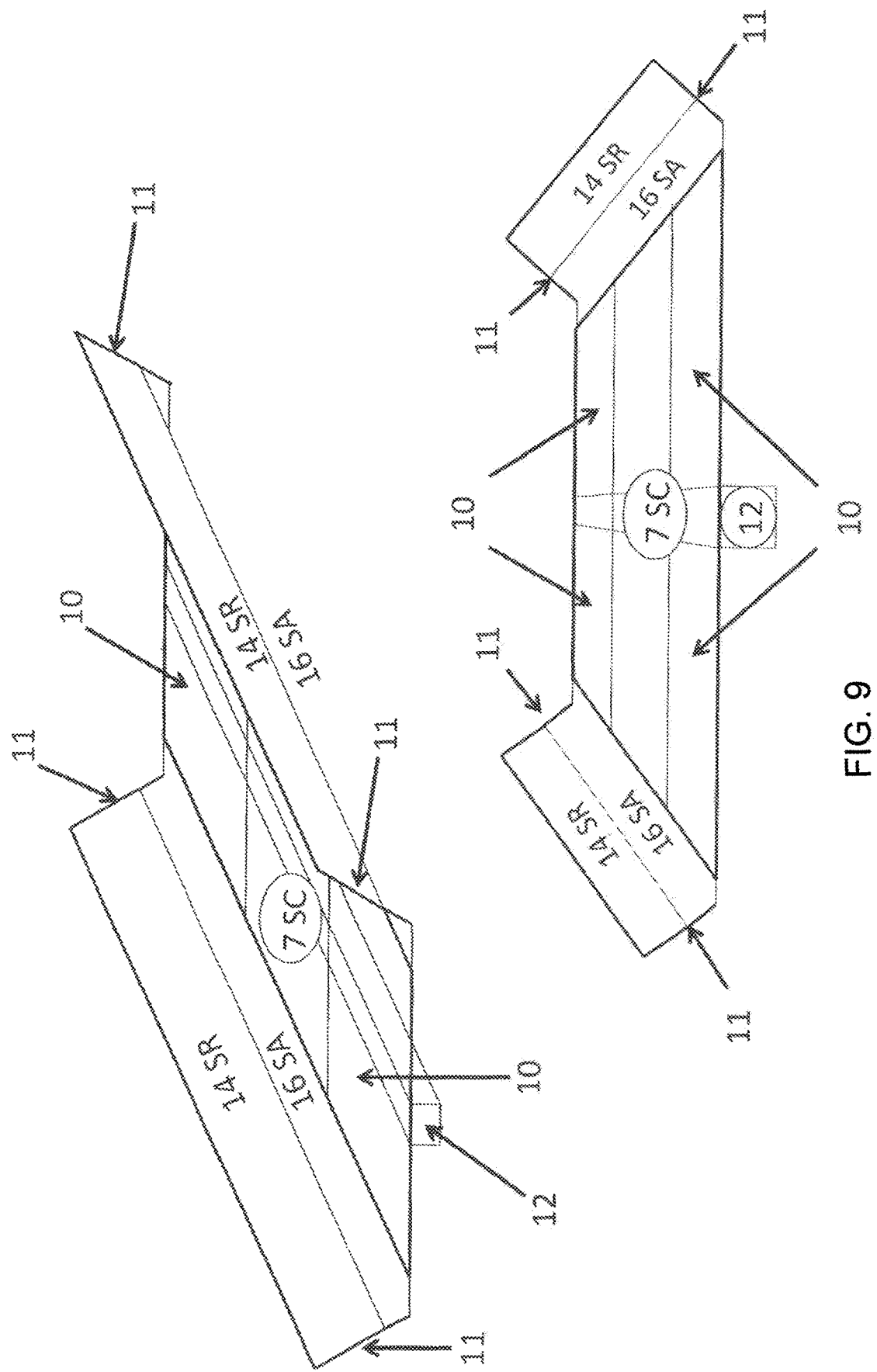
FIG. 9 shows a tilting load-bearing frame.

The photovoltaic system, with single-axis tracking at 0° of inclination (FIG. G n. 6), a known technology, consists of a series of photovoltaic panels (FIG. H n. 8) directly installed in a fixed manner on a tilting load-bearing frame (FIG. 9 n. 9). This frame is anchored to a rotating axis (FIG. 9 n. 12) which, connected to a series of mechanical parts manages by a motorization, controlled by an appropriately programmed electronic unit, to orient the photovoltaic panels in the optimal way for capturing solar radiation. The invention entails the installation of a single-axis tracking photovoltaic system with 0° inclination (FIG. G n. 6) in the designed walkway-gutter channel (FIG. 5 n. 1) present between the roofs of the structure and anchored to its own supporting pillars. The planned installation of the photovoltaic system in the described walkway-gutter channel (FIG. 5 n. 1) and anchored to the same support pillars of the underlying structure, shown in the drawings attached in FIG. G, represents an innovation of the existing technology (which it is intended to be protected with claim no 9).

This location allows savings on the costs of all the works and, not negligible, costs necessary to build solid foundations as well as adequate support pillars suitable for securely fixing such systems, which are strongly exposed to wind stress, to the ground. In the present invention, the rotation axis (FIG. 9 n. 12) of the solar tracker is arranged mainly in the north-south direction. The system therefore, rotating slowly from east to west and directing the photovoltaic panels towards solar radiation, will pursue the best exposure during all hours of the day. The single-axis tracking photovoltaic system, known technology, is substantially innovated with the introduction of a load-bearing tilting frame (FIG. 9 n. 9) in steel, rigidly connected to a rotating axis (FIG. 9 n. 12) which, suitably prepared, in addition to the installation of photovoltaic panels (FIG. 8 n. 8), allows to associate a system reflecting the solar radiation (FIG. 10 n. 13) and a water system (FIG. 11 n. 17); known technologies that are innovated with the contribution of specific modifications aimed at overcoming the drawbacks and limitations of traditional systems and can be advantageously used in the present integrated "greenhouse-photovoltaic" unit of the present invention. The association of a photovoltaic system with single-axis tracking at 0° degrees of inclination with a system reflecting solar radiation and with a water system for cooling the photovoltaic panels presents an innovation of the pre-existing technology (which is intended to be protected by claim no 2). The photovoltaic system with single-axis tracking at 0° degrees of inclination (FIG. G n. 6), provided in said integrated system, could advantageously be used also associated only with the system reflecting the solar radiation (FIG. 10 n. 13) (claim. No 3) or also associated only with the water system (FIG. 11 n. 17) for cooling and washing of the photovoltaic panels (rev. No 4). These variants of the unitary integrated system represent an innovation of the pre-existing technology (which are intended to be protected, respectively, with claims no 3 and no 4). The two technologies that are associated to the photovoltaic system provide the greater irradiation of the photovoltaic panels, obtained through the use of surfaces reflecting solar radiation, and the cooling of the photovoltaic panels, obtained by the specific water system that allows, uniformly on the collecting surfaces, a certain quantity of water thus lowering the temperature and, at the same time, washing them. The greater radiation, the lower temperature and the cleanliness of the capturing surfaces, contributes considerably to increasing the production of electricity.

The Tilting Load-Bearing Frame

The present invention provides for the realization of a tilting load-bearing frame (FIG. 9 n. 9) in steel which constitutes a better anchorage for the photovoltaic panels (FIG. 8 n. 8), giving greater solidity to the entire apparatus and which, moreover, is set for the installation of a reflective system (FIG. 10 n. 13) and a water system (FIG. 11 n. 17).

The steel tilting load-bearing frame (FIG. I n. 9) consists of a flat central base (FIG. 9 n. 10) intended for the installation of photovoltaic panels (FIG. 8 n. 8) and wings with flat sides (FIG. 9 n. 11), but inclined with respect to the base, intended for the installation of reflective panels (FIG. 10 n. 15) and is designed also for the installation of pipes (FIG. 11 n. 19) for the dual circuit water system (FIG. 11 n. 18 sx and 18 dx) for cooling and washing. The inclination of the lateral wings will be such as to direct the solar radiation reflected by the reflecting panels directly and uniformly on the captive (SC) surface of the photovoltaic panels (FIG. 8 n. 8). In the underlying part of the tilting load-bearing frame (FIG. 9 n. 9), and more precisely in the centre of the same, allowing the overlying weights to be perfectly balanced, will be rigidly connected along its entire longitudinal development, a steel tube with the function of rotating axis (FIG. 9 n. 12) of structure.

In this system, a further substantial innovation is introduced and consists in sizing the inclined wings (FIG. 9 n. 11) of said tilting load-bearing frame (FIG. 9 n. 9) so that the reflective panels (FIG. 10 n. 15), which are installed on the wings, are not adjacent to the photovoltaic panels (FIG. H n. 8) but are sufficiently spaced. All of this in order to create, between the reflective panels and the photovoltaic panels, an adequate open-space (SA) (FIG. 10 n. 16). This open-space (SA) (FIG. 10 n. 16) allows the ventilation of the photovoltaic panels favouring heat dissipation and also allowing the wind to flow away cancelling the proportional "sail effect" better illustrated later on. In the part below the structure of the tilting load-bearing frame (FIG. I n. 9), shock absorbers and/or calculated counterweights, are installed that are suitable to make the whole device more resistant to wind stress. The invention of said tilting load-bearing frame (FIG. 9 n. 9) represents an innovation of the existing technology (which is intended to be protected by claim no 8). All reported in the attached drawings (FIG. 9 n. 9); in which the part marked with the number 14 and with the letters SR (reflective surface) represents the part of the frame on which the reflecting panels will be installed (FIG. 10 n. 15), the part marked with the number 16 and with the letters SA (open-space) represents the space that remains open and the part marked with the number 7 and with the letters SC (capturing surface) represents the part of the frame on which the photovoltaic panels will be installed (FIG. H n. 8). The introduction, in the photovoltaic system with single-axis tracking at 0° inclination, of said tilting load-bearing frame and its configuration, which entails the described open-space between the capturing panels and the reflective panels, represents an innovation of the pre-existing technology (which is intended to be protected with claim no 8). The described tilting load-bearing frame is shown in the attached drawings in FIG. I and indicated with the number 9. The present invention overcomes, with this solution, the limitations and disadvantages of the existing technology.

The Solar Radiation Reflective System

The greater irradiation, in the pre-existing technology, is achieved, through the use of reflective surfaces and thanks to a predetermined inclination, that directs reflected solar radiations on the capturing surface of the photovoltaic panels joining, seamlessly, laterally and rigidly the photovoltaic panels and the reflective panels, thus creating a single body between them. The shape assumed by this structure is that of a flat surface with two inclined wings at the lateral ends; the flat surface is that of the photovoltaic panels joined to the two flat but inclined surfaces, of the two wings made up of reflective panels. This technology has two disadvantages; the overheating of the photovoltaic panels and the greater vulnerability to wind stress. In this technology the two inclined wings, i.e. the reflective surfaces directly joined to the two sides of the capturing surface, constitute a shielding, which disadvantages normal ventilation thus reducing the heat dissipation of the photovoltaic panels which results more overheated precisely because of the greater irradiation due to the reflective surfaces.

It is well known that the production of electrical energy by the photovoltaic panels is inversely proportional, in a linear function, to their temperature; therefore if on one hand the reflective surfaces increase the production of energy on the other hand the overheating of the photovoltaic panels significantly reduces this increase. The above, overheating of the photovoltaic panels, objectively represents a limit of the current technology that the present invention overcomes thanks to the described open-space (SA) (FIG. 10 n. 16), between the photovoltaic panels (FIG. H n. 8) and the reflective panels (FIG. 10 n. 15), which favors ventilation and therefore the disposal of heat. A second disadvantage is due to the concave configuration of these walls, ie a single body consisting of a flat surface and the two surfaces of the inclined wings joined to the lateral ends, the profile of which generates the so-called "sail effect", that is aggravated by the increase in surface area due to the size of the wings, which exposes them to even more wind stresses. It is well known, in fact, that tracking photovoltaic systems, being extremely vulnerable to wind stress, are all equipped with a mechanism that automatically sets the photovoltaic panels of the entire system, when the wind intensity increases, in the position of "protection", which is horizontal, so as to assume a profile suitable to better resist the strong stresses, reducing the risk of possible serious damages. However, this necessary automation, even if protects the photo-voltaic system from serious damage and also from its possible destruction has, as its disadvantage, the lower efficiency in the production of electricity. In fact, on all the days of the year in which, due to the strong wind, the system goes into "protection" mode (a mode in which the photovoltaic panels are arranged, and remain for many hours or even for days, fixed in the horizontal position) there is a lower efficiency in the production of electrical energy caused by the fact that the system no longer pursues the optimal orientation with respect to solar radiation.

The increased vulnerability to wind stress objectively represents a limitation of current technology. The present invention overcomes this limit thanks to the described open-space (SA) (FIG. 10 n. 16) which, by allowing the outflow of the wind, makes the entire structure more resistant and less vulnerable to strong stresses. The creation of this open-space (FIGS. 8, 9, 10 n. 16 SA) between the capturing surfaces (FIGS. 8, 9, 10 n. 7 SC) and the reflective surfaces (FIGS. 8, 9, 10 n 14 SR) represents an innovation of the pre-existing technology (which is intended to be protected by claim no 10). All reported in the attached drawings in figures 8, 9 and 10 and indicated with the letters SA and with the number 16.

The Water System for Cooling

The present invention provides that, on the tilting load-bearing frame (FIG. 9 n. 9) in the open-space (FIGS. 8, 9, 10 n. 16 SA) which extends longitudinally between the photovoltaic panels (FIG. 8 n. 8) and the reflective panels (FIG. 10 n. 15), a specific pipe is installed (FIG. 11 n. 19), connected to the main water system of the greenhouse, suitable for releasing a predetermined quantity of water uniformly over the capturing surface of the photovoltaic panels thus cooling them and washing them at the same time. The quantity of water supplied by the water system (FIG. 11 n. 17), for cooling and washing the photovoltaic panels, will be recovered, through the walkway-gutter channel (FIG. 5 n. 1), and used for irrigation of crops or, if not necessary, conveyed, through a filtering system, to a collection tank to be subsequently reused. This system, avoiding unnecessary dispersion, contributes to a significant water saving.

The water system (FIG. 11 n. 17), a component part of the invention, has two innovations compared to a traditional system for cooling and washing of modules. The first innovation consists of a double-circuit (FIG. 11 n. 18 sx and 18 15 dx) which is made up of two independent water pipes that are installed on the predisposed tilting load-bearing frame (FIG. 9 n. 9) and precisely along the two sides of the longitudinal development of the large surfaces of the photovoltaic panels. The second innovation consists in the installation of a particular switching valve (FIG. 11 n. 20) that, controlled by the mechanization of the solar tracker, activates the flow of water initially into the first of the two circuits (FIG. 11 n. 18 sx), excluding the second, and later, when the inclination of the entire capturing surface of the photovoltaic panels is reversed due to the rotation of the solar tracker, it excludes the first circuit, introducing the water into the second circuit (FIG. 11 n. 18 dx). So that water can always flow correctly on the large surface of the photovoltaic panels, cooling and washing them constantly throughout the day. This double-circuit (FIG. 11 n. 18) water system (FIG. 11 n. 17), including the relative pipes (FIG. 11 n. 19) and said switching valve (FIG. 11 n. 20), represents an innovation of the pre-existing technology (which is intended to be protected by claim no 11). As shown by the attached drawings in FIG. M, the first water circuit is indicated by the number 18 (*sx*) located on the left side and the second water circuit, is indicated by the number 18 (*dx*) and located on the right side. The water pipes are indicated with the number 19 and marked with the number 20 is indicated the valve for switching the water flow.

The High Performance Photovoltaic System

Ultimately, the new technology found, for the photovoltaic component of the invention, consists in having innovated and associated in a single system several technologically different systems: The photovoltaic system, the reflective system and the water system. The result of this innovative association is an advanced photovoltaic system, with a very high yield in the production of energy, obtained at lower cost and which allows practicing any cultivation in the underlying soil. This system is itself integrated with the other component part of the invention, being the structures for the agricultural function. However, this system could be advantageously used, independently, also in other sectors.

The Performance of the Integrated System in the Production of Electric Energy

To better evaluate the high efficiency of the photovoltaic system, component part of the invention, it is appropriate to compare the results, in the productivity of electricity, with a traditional greenhouse system. It is known that the vast majority of photovoltaic plants built on greenhouses are those that have the only stratum facing south covered by photovoltaic panels. This configuration is comparable to that of a photovoltaic system built in the "fixed to ground" mode, which is the technology mainly used, with photovoltaic panels oriented south, with latitude of central and southern Italy and with the optimal inclination of 30°. In reality, the photovoltaic systems installed on the greenhouses, with the photovoltaic panels arranged on a single stratum facing south, have, in most cases, the non-optimal inclination of between 10° and 20° with consequent lower efficiency. In this comparison, this reduction factor in the performance of traditional systems will not be taken into account, nor will the greater yield hypothesized be taken into account, for the photovoltaic system of this invention, resulting from the greater cleaning of the photovoltaic panels due to the constant washing. That said, a traditional "fixed to the ground" system, installed at the latitude of the south-central Italy with an inclination of 30°, has an electricity production of around 1,450,000 kWh per year for each MWp of photovoltaic power installed (with an inclination between 10° and 20° the production of electric energy is reduced to around 1.400.000 kWh per year). At the same latitude, the invention's designed photovoltaic system, being an east-west single-axis tracking with 0° inclination, has an electricity production of approximately 2,050,000 kWh per year for each MWp of photovoltaic power installed. This energy production, in the planned optimal configuration of the photovoltaic system, is due to the use of the reflective system that increases it by 30%. This increased result is the product of the calculated impact based on the size of the surface of the panels reflecting the solar radiation. However this increase could be greater if the surfaces of the panels reflecting the solar radiation were increased. This increased production of electricity is further increased, with the cooling water system, by a percentage that varies between 10% and 20%, depending on the water temperature and weather conditions of the day. However, for the purposes of this comparison, a prudent average value of 15% will be used for the quantification of the increase, of the electricity produced in a year, deriving from the water system for cooling photovoltaic panels. Therefore, considering 2,050,000 kWh produced per year by the single-axis tracking photovoltaic system and adding to this value an increase of 30% brought by the associated reflective system and an average prudential increase of 15% (and not 20%) brought by the associated cooling system, a prudential value of approximately 2,972, 500 kWh produced annually for each MWp of photovoltaic power installed is reached. Without taking into account that the structure of the inclined pitched roofs, in its optimal "complete greenhouse" configuration made of glass, contributes to greater irradiation due to the reflective effect of the glass surfaces of the inclined pitches which, in some hours of the day, direct the solar radiation reflected on the capturing surfaces of the photovoltaic panels thus increasing their efficiency in the production of electricity (albedo effect). It follows that the new technology of the invented photovoltaic system guarantees a production of electricity more than doubled compared to that of traditional systems while occupying roughly the same quantity of arable land. Therefore, the realization of the present integrated system is economically advantageous.

The Advantages of the Integrated System

The favorable association of two different production plants, the agricultural one and the photovoltaic one, in a single innovative integrated system, as envisaged and configured in the present invention, makes it possible to achieve relevant advantages.

1) An advantage concerns the investment costs. By combining, the two systems have many of the component parts in common. In fact, the high-performance photovoltaic system designed, for its structure and its operation, uses the same component parts already made for the greenhouse system. Duplication is thus avoided and consequent considerable savings in investment costs.

2) An advantage concerns management costs. The integrated system of this invention, as already reported, provides for the association of two activities, the agricultural one for crop cultivation and the photovoltaic one for the production of electricity. Agricultural activity, as is known, requires at all stages of cultivation, substantial quantities of electricity that is purchased at the high cost of the free market. The electricity needed for agricultural activities, for irrigation, for the possible heating or cooling of the greenhouses, for ventilation, for lighting and even for surveillance systems and monitoring, is self-produced by the photovoltaic part of the same system thus extremely reducing costs. Again, there is the advantage of considerable economic savings.

3) Still regarding the costs, an additional advantage derives from the renewed water system. This system, as already illustrated, provides an additional double-circuit, installed on the tilting load-bearing frame and precisely on the side of the capturing surfaces of the various strings of the photovoltaic panels, connected to the main water system intended for irrigation of crops. This double-circuit is used for cooling and washing of photovoltaic panels. This plant contributes to increasing the efficiency of the photovoltaic panels but, at the same time, its operating entails costs. Therefore, considering that the constant irrigation of the plants is an indispensable factor for the success of the crops, the circuit of the water system has been designed so that the water, before being used for irrigation, passes on the photovoltaic panels by cooling and washing them. This system allows, whenever the crops are irrigated, to therefore eliminate costs for the cooling and washing of the photovoltaic panels.

4) In addition, the water, passing through the photovoltaic panels, heats up and reaches higher temperature and when used for irrigation, especially in the winter months, helps the development of cultivated plants. All this constitutes a substantial economic advantage.

5) The open-space provided between the photovoltaic panels and the reflective panels, allowing ventilation and therefore a better dissipation of heat, brings the advantage of a greater efficiency of the system in the production of electricity.

6) A further advantage of the invention relates to the protection of the photovoltaic system from wind stresses. The photovoltaic system installed on the roofs, and precisely on the walkway-gutter channel between the opposing pitches of the adjacent aisles, is located underneath the horizontal ridge line and is therefore more protected from wind stress. In fact, the photovoltaic system, against the winds coming from the north or from the south, exposes its less vulnerable side to stresses, while, against the winds coming from the east and the west, even if exposing a more vulnerable profile, is protected both by the higher height of the roof pitches and by their inclined shape which is such as to deflect the direction of the winds upwards. Thus possible damage is avoided and moreover the photovoltaic system, not having to turn into a "protective" horizontal position, has a greater production of electricity.

7) The open-space provided between the photovoltaic panels and the reflective panels, cancelling the "sail effect", has the advantage of a lower vulnerability to wind stress. For this reason, also in this case, damage is avoided and there is a greater production of electricity.

8) Another advantage that the system offers is the greater cleanliness of the capturing surfaces of the photovoltaic panels. In fact, the photovoltaic system, being lifted from the ground, is less subject to receiving dusts and dirt that, by attaching to the capturing surface of the photovoltaic panels, would reduce its efficiency.

9) Furthermore, as we have already described, the continuous transit of water on the photovoltaic panels carries out constant washing with the consequent advantage of a better performance due to the cleaning of the surfaces capturing the solar radiation.

10) Another advantage, which offers the invented system, concerns the maintenance and safety of the workers involved in these operations. In fact, the photovoltaic system, although located at a certain height from the ground, is installed in the expected large walkway-gutter channel, therefore it is extremely easy to carry out all maintenance operations in the same way as a system placed on the ground in safety. Also in this case, an economic advantage is achieved due to both the less time required to carry out maintenance and the lower costs, since these operations do not require the use of ladders, lifting platforms or lifting baskets necessary to reach the plants built for a certain height from the ground. All the costs due periodically for the removal of the weeds from the land occupied by the photovoltaic systems built in the "fixed to the ground" mode are also saved. Furthermore, in this system, since the photovoltaic system is located outside the greenhouse structure, there are no disadvantages and complications due to the fact of having to carry out ordinary and extraordinary maintenance operations from inside the greenhouse itself and in which the crops are underway.

Difficulties and complications are instead incurred in structures made with the existing technology.

11) Another advantage that the invented system offers consists in the flexibility/reversibility of the use of the structure in its agricultural function. In fact, all the designed structure is conceived according to the criterion of modularity and is made in "modular mode", that is, by assembling or disassembling some of its component parts, it is possible to adapt to the substitution of the crops and their different needs.

12) With reference to the agricultural function, another advantage offered by the invented system consists in the greater quantity of solar radiation usable by the crops. The total amount of light received by the surface of the ground, below the installed photovoltaic system, is determined by the amount of diffused light and the amount of direct light. The invented system allows crops to benefit from a quantity of diffused light higher than that of traditional greenhouse photovoltaic systems, due to the greater surface area of the coverings transparent to light. The quantity of direct light depends on the quantity of light coming from the roofs and from the perimeter curtain walls. The amount of light coming from the roofs depends on the ratio between the free surface, not occupied by the photovoltaic system, transparent to light and the surface, occupied by the photovoltaic system, not transparent to light. The invented system, in the expected optimal configuration, entails that the 80% of reflecting surfaces will be transparent to light. The amount of light coming from the perimeter curtain walls depends on their height and this can vary according to the different cultivations practiced. The typical configuration of the invented system provides for an average height from the ground of 5 meters, which corresponds to an additional amount of direct light of about 13%. Thus the cultivations, carried out in the ground below the photovoltaic system, receive 93% of the direct incident light on the entire surface occupied by the system. Furthermore, the shading, due to the photovoltaic system above, does not station, during all hours of the day in the same place, but moves from west to east following inversely the direction of the sun. Thus the crops always benefit from all the diffused brightness, of 93% of the direct light, and moreover the minimum shade is temporary with a short duration compared to the individual cultivated plants. It follows that the shading caused by the overlying photovoltaic system is equivalent to that caused by the short transit of a passing cloud and is therefore completely irrelevant to cultivation purposes.

13) With reference to the photovoltaic function, another advantage, which the invented system offers, consists in a greater increase in the production of electricity equal to more than double compared to the production of a traditional photovoltaic system, fixed to the ground or fixed on the roofs of a greenhouse, which occupies roughly the same area of land. This greater increase is due to the single-axis tracker, the apparatus reflecting the solar radiation and the water system that constantly refreshes and washes the photovoltaic panels. Thus the incidence of the costs of the entire structure, per kWh of electricity produced by occupying roughly the same area of land as traditional plants, makes the economic investment very convenient, and even more convenient since the invented system allows, at the same time, to be able to use, perfectly and without any limitation, the ground beneath for all types of agricultural cultivations. In conclusion, the invention allows to achieve its purpose and to achieve all the results of the set objectives. It is to be understood that all of the above and illustrated represents only a chosen, but not limitative, form of the potential realization of this invention. However, according to the needs, other equivalent embodiments are possible which always refer to the scope of the same inventive concept. Therefore, it is to be understood that the description of the invention, as described above and also illustrated in the attached drawings, must also be extended to the other embodiments, which can for example vary in shapes, dimensions, materials and in anything else equivalent, but which in any case always refer to the same inventive concept, falling within the scope of protection of the claims listed below.

The invention claimed is:

1. An integrated unitary device that associates four different systems, comprising:
    a greenhouse or a structure in metallic carpentry constructed as a modular structure having, in a roof of the modular structure, a walkway-gutter channel;
    a photovoltaic system having a tilting load-bearing frame, a central flat surface installed with photovoltaic panels, and two lateral wings configured as two flat surfaces that are inclined with respect to the central surface, and that are installed with reflective panels reflecting solar radiation;
    a reflective system comprising the reflective panels, which direct the solar radiation reflected to a capturing surface of the photovoltaic panels, a space being provided between the photovoltaic panels and the reflective panels, so as to dispose of heat produced by the photovoltaic panels and an outflow of wind; and
    a water system that cools and washes the photovoltaic panels and comprises a double piping circuit that develop laterally, the double piping circuit comprising a first pipe disposed on one side and a second pipe disposed on an opposite side along an entire length of the capturing surface of the photovoltaic panels, the water system further comprising a switching gate valve that is configured to reverse a flow of water alternately from a first piping circuit of the double piping circuit to a second piping circuit of the double piping circuit, and vice versa, from the second piping circuit to the first piping circuit.

2. The integrated unitary device, as per claim 1, wherein the system reflecting the solar radiation is connected in a rigid way to said photovoltaic system, and the water system for cooling and washing the photovoltaic panels is connected to said photovoltaic system.

3. The integrated unitary device, as per claim 1, wherein the system reflecting the solar radiation is connected in a rigid way to said photovoltaic system.

4. The integrated unitary device, as in claim 1, wherein the water system that cools and washes the photovoltaic panels is connected to said photovoltaic system.

5. The integrated unitary device, as per claim 1, wherein the greenhouse has the walkaway-gutter channel between opposing inclined slopes of adjacent roof naves.

6. The integrated unitary device, as per claim 1, wherein the structure in metallic carpentry has the walkway-gutter channel extending between modules of the modular structure.

7. The integrated unitary device, as per claim 1, wherein the walkway-gutter channel is dimensioned to allow all maintenance operations and a recovery and channeling of rainwater.

8. The integrated unitary device, as per claim 1, wherein the tilting load-bearing frame is configured with a flat base for installation of the photovoltaic panels and two wings that are flat and inclined in relation to the flat base, for the installation of the reflective panels and of pipes of the double piping circuit, an open space being provided, between the capturing surface of the photovoltaic panels and a surface reflecting solar, so as to enable heat dissipation of the photovoltaic panels and an outflow of the wind.

9. The integrated unitary device, as per claim 1, wherein the photovoltaic system is associated with the reflective system and/or the water system that cools and washes the photovoltaic panels in the walkway-gutter channel and is set on same support pillars as the greenhouse or the structure in metallic carpentry.

10. The integrated unitary device, as per claim 1, wherein the reflective system is associated and rigidly connected to the photovoltaic system and has an open space between surfaces of the photovoltaic panels and surfaces of the reflective panels so as to allow a disposal of heat and an outflow of the wind.

11. The integrated unitary device, as per claim 1, wherein the water system that cools and washes the photovoltaic panels has the double piping circuit with the first and the second pipe installed on opposite sides of a longitudinal development of an entire capturing surface of the photovoltaic panels, and is connected to a water flow switch gate valve mechanically or electronically controlled by a solar tracker.

12. The integrated unitary device, as per claim 1, wherein the modular structure is configured in one in four configurations: "totally open", "hail proof" mode, "covered but open" mode, and "complete greenhouse" mode.

13. The integrated unitary device, as per claim 1, wherein the integrated unitary device provides full autonomy and total independence during production activities of two sectors of the integrated unitary device, the two sectors comprising an agricultural sector and a photovoltaic sector, without harmful interference or unfavorable conditions, and creates synergies between the two sectors.

* * * * *